United States Patent Office 3,513,941
Patented May 26, 1970

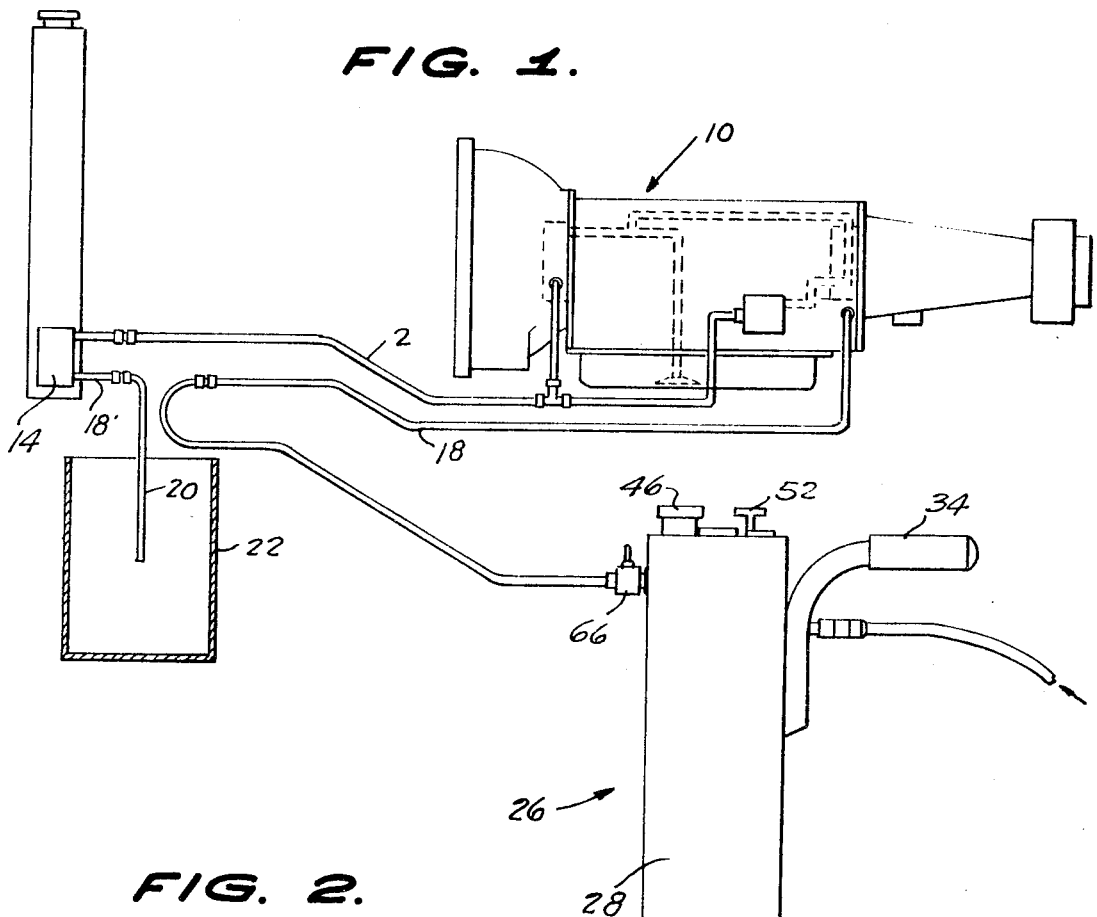
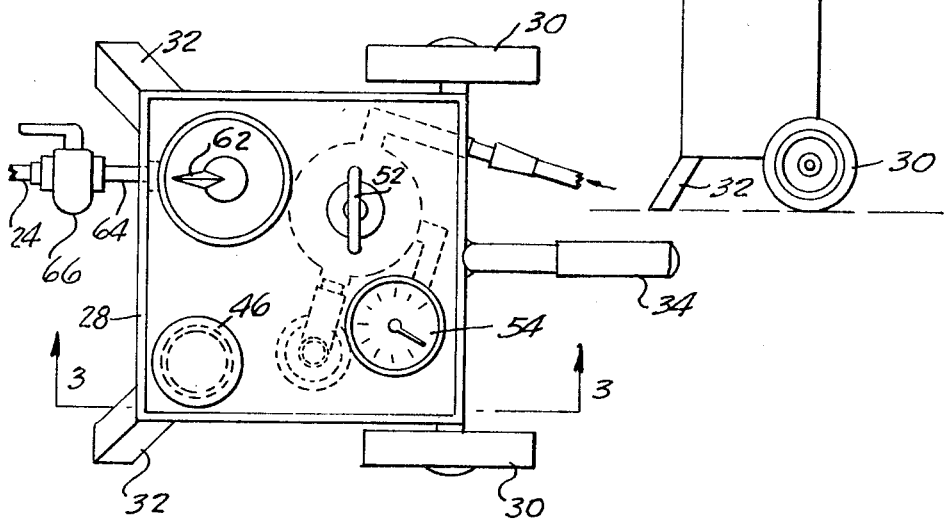

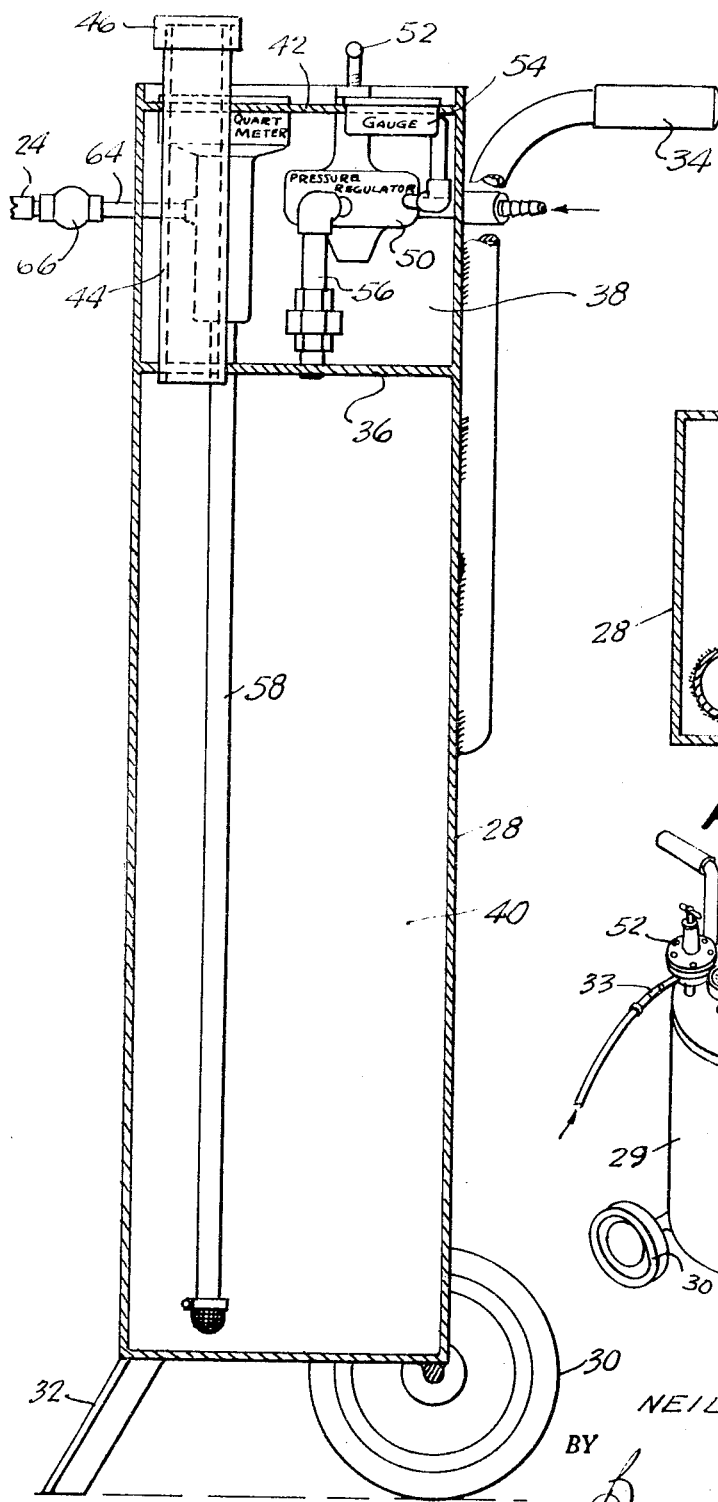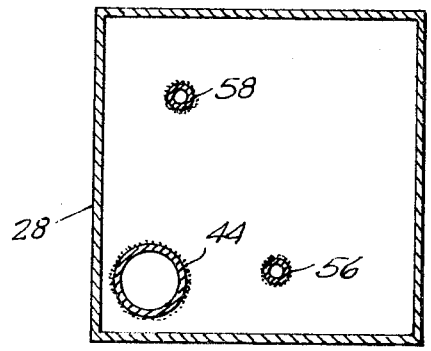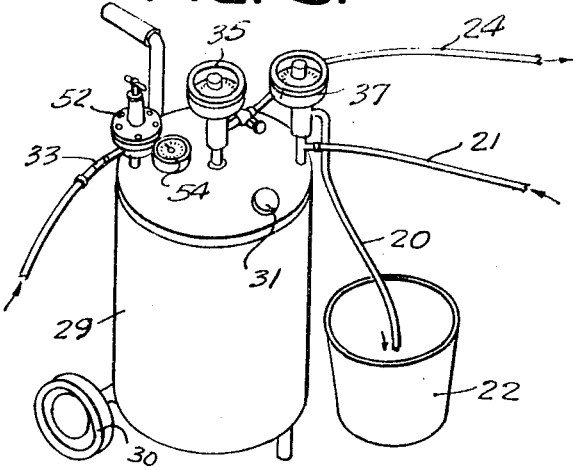

3,513,941
FLUID CHANGE MEANS FOR AUTOMATIC
TRANSMISSIONS
Neil J. Becnel, Rte. 2, Box C164B,
Belle Chasse, La. 70037
Filed Oct. 20, 1967, Ser. No. 676,782
Int. Cl. F16n 33/00
U.S. Cl. 184—1.5                                           1 Claim

ABSTRACT OF THE DISCLOSURE

Fluid change means for automatic transmissions comprising a tank for fresh fluid; means for connecting a source of gas pressure to said tank; means for regulating the pressure applied to said tank; an outlet for said tank; metering means between said tank and said outlet, means for connecting said tank outlet to the return line from the oil cooler of an automatic transmission and means to discharge said cooler to a used-fluid receptacle.

---

Automatic transmissions for motor vehicles in the present day are exceedingly complex mechanisms. The fluid in such transmissions is used in part as an actual driving means through a pump-turbine combination; in part to operate several controls and, in part, as a lubricant. Between the several functions, the fluid subjected to enormous turbulence with a generation of considerable heat, in most transmissions therefor, it is necessary, in order to keep the oil at optimum condition for its several functions, to run the oil through a cooler (usually forming a part of the radiator), and thence back into the system. Quite clearly, with a multitude of passages through which the oil must pass incident to the performance of its several quite diverse functions, complete drainage by gravity methods is quite impossible to secure.

The present invention does not contemplate drainage in the conventional sense. Rather, it contemplates intercepting the return line from the cooler, connecting the return line to a source of fresh oil under pressure and connecting the discharge from the cooler directly to a discharge receptacle. Fresh oil under pressure (while the engine is operating) will serve literally to drive all of the used oil out of the system and replace it with fresh clean fluid. By this means, drainage, flushing and refilling is accomplished without opening or adjustment of any of the parts and the car owner is assured of a thoroughly clean job with no potential for disturbance of any otherwise properly adjusted parts.

The above and other objects of this invention will be made clear from the following detailed description taken in connection with the annexed drawings, in which:

FIG. 1 is a highly schematic view showing automatic transmission with the improved fluid change means properly connected;

FIG. 2 is a plan view of the improved fluid change means;

FIG. 3 is a section on the line 3—3 of FIG. 2;

FIG. 4 is a section on the line 4—4 of FIG. 3; and

FIG. 5 is a perspective view of a modified arrangement of the fluid change means.

Referring now to FIG. 1, an automatic transmission which may be of any of the conventional types is indicated generally by the numeral 10. At its left-hand end it is connected to the conventional engine, not shown, and at its right-hand it is connected to a conventional drive shaft, not shown. In most automatic transmissions, there are at least two pumping units, one forward and one to the rear, each of which discharges to a line 12 which goes to a cooler 14 mounted in or adjacent the conventional radiator 16. The cooler, of course, is simply a simple form of heat exchanger. A return line 18 normally connects the cooler 14 back to the transmission pan or sump, whence the oil works its way throughout the entire transmission system. There is usually a flexible tubular connection between the portion of the return line 18' connected directly to the cooler and the remainder of the line 18 which goes back to the transmission. This is removed and a section of hose or pipe 20 is connected to the cooler outlet 18' and discharges used oil into a receptacle 22. The line 18 is connected by a pipe or hose 24 to the improved change means of this invention indicated generally by the numeral 26. The preferred change means comprises a tank 28 portably mounted by wheels 30 and legs 32. It is readily movable by means of a handle 34 welded to the tank 28.

Referring now to FIG. 3, the tank 28 is divided by a transverse baffle 36 into an upper compartment 38 and a lower fluid storage tank 40. A top plate 42 confines the upper chamber 38 and is pierced by a filling pipe 44 which penetrates both the top plate and the baffle 36. The pipe 44 is closed by a hermetically fitting cap 46.

An air inlet nozzle 48 penetrates the wall of the upper compartment 38 and connects to a pressure regulator 50. The regulator 50 is controlled by a manual handle 52 and is also connected to a gauge 54 visible from the top 42. The gauge 54 registers the pressure present in the bottom tank or compartment 40. The pressure regulator 50 is connected to a pipe 56 which penetrates the baffle 36 for communication with the lower tank 40.

The discharge pipe 58 extends nearly to the bottom of the chamber 40 and penetrates the baffle 36 to connect with a conventional meter 60. An indicator 62 above the top plate 42 shows the quantitiy of fresh fluid delivered to pipe 24. The meter 60 connects to a pipe 64 which penetrates a side wall of the upper compartment 38 and is joined to the pipe 24, previously mentioned. With the parts connected, as shown in FIG. 1, and with the automotive engine running, it is only necessary to manipulate the pressure control valve 52 to bring the desired reading on the gauge 54 and to open a cut-off valve 66. Oil then will flow into the transmission 10, gradually displacing and replacing the old oil which discharges through pipe 20 and the receptacle 22.

FIG. 5 shows a modified arrangement of the fluid change means. In this figure of the drawings a tank 29 is divided into upper and lower compartments just like the tank 28. It is filled through a cap connection 31 and has an inner pressure connection 33 which forces oil up through a meter 35 which connects to the pipe or tube 24 through the same channel, as shown in FIG. 1.

Please note that in line 24, whether the tank 29 of FIG. 5 or the tank 28 of FIG. 1 be connected thereto, it may be used to "fill" or "replenish" a transmission through its ordinary filling pipe. The device, therefore, has utility quite apart from its flushing function.

The discharge pipe 18' from the cooler 14, shown in FIG. 1, is connected by a flexible pipe 21 to a meter 37 which connects to a discharge pipe 20 and discharges into a receptacle 22. The inlet 33 feeds through a pressure controller 52 and internal pressure in the lower portion of the tank 29 is indicated on a gauge 54. The advantage of this arrangement is that the output gauge 35 and the discharge gauge 37 are in close proximity and equally visible from the vantage point of the operator. When the gauge 37 indicates that about the same amount of fluid has been discharged in the receptacle 32, as was forced out of the tank 29 by the air line 33, it is time to shut down the procedures, reconnect the line 18 to the discharge pipe 18' and bring the transmission to the proper level by conventional methods.

It is clear enough that while certain specific details have been disclosed herein, many of these details may be changed by one skilled in the art without departure from the principles of this invention. It is not intended, therefore, that this invention be limited to the precise details disclosed but only as set forth in the subjoined claims.

What is claimed is:

1. A method of simultaneously draining and refilling the fluid in motor vehicle automatic transmission while simultaneously flushing the transmission and its entire fluid system, such transmission being of the type having a self-contained fluid pumping means and a separate fluid cooling unit having an input line from said transmission and a return line to said transmission, all the fluid in said transmission circulating through said cooler, said method comprising: interrupting the return line from the cooler to the transmission to permit free discharge of fluid from the cooler; connecting the return line to a source of fresh fluid; starting the engine of the vehicle activate the transmission and its pumping system; continuously delivering fresh fluid from said source to the return line from said cooler to said transmission; metering said fresh fluid until approximately the entire capacity of said transmission and the cooler has been delivered; thereafter stopping said engine, cutting off said source and restoring said return line to provide closed circuit circulation.

References Cited

UNITED STATES PATENTS

| | | | |
|---|---|---|---|
| 1,584,505 | 5/1926 | Bevins | 134—23 |
| 1,829,173 | 10/1931 | Wertz | 184—1.5 |
| 1,884,820 | 10/1932 | Osborne | 134—23 XR |
| 2,105,761 | 1/1938 | Wood | 184—1.5 |
| 3,216,527 | 11/1965 | Lewis | 184—1.5 |

FOREIGN PATENTS 939,809   4/1948   France.

ROBERT A. O'LEARY, Primary Examiner

M. A. ANTONAKAS, Assistant Examiner

U.S. Cl. X.R.

134—23